United States Patent
Kurata et al.

(10) Patent No.: US 6,220,874 B1
(45) Date of Patent: Apr. 24, 2001

(54) WIRE HARNESS ASSEMBLY

(75) Inventors: Kazunori Kurata, Yokkaichi; Nobuhiro Takada, Toyoto, both of (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/276,784

(22) Filed: Mar. 25, 1999

(30) Foreign Application Priority Data

Mar. 26, 1998 (JP) .................................................. 10-079989
Mar. 26, 1998 (JP) .................................................. 10-079990
Apr. 1, 1998 (JP) .................................................. 10-089103

(51) Int. Cl.$^7$ .............................. H01R 12/00; H05K 1/00
(52) U.S. Cl. .......................................................... 439/76.2
(58) Field of Search .................................. 439/76.2, 404, 439/949, 395, 942

(56) References Cited

U.S. PATENT DOCUMENTS

| | | | |
|---|---|---|---|
| 5,484,076 | * 1/1996 | Petrushka | 220/3.9 |
| 5,501,605 | 3/1996 | Ozaki et al. | 439/34 |
| 5,782,651 | * 7/1998 | Konoya | 439/405 |
| 5,888,088 | * 3/1999 | Kobayashi et al. | 439/404 |
| 5,967,832 | * 10/1999 | Ploehn | 439/497 |

FOREIGN PATENT DOCUMENTS 0729200  8/1996  (EP) .

OTHER PUBLICATIONS

European Search Report EP 96 10 2526, Oct. 31, 2000.

* cited by examiner

Primary Examiner—Lincoln Donovan
Assistant Examiner—Chandrika Prasad
(74) Attorney, Agent, or Firm—Bierman, Muserlian and Lucas

(57) ABSTRACT

A wire harness assembly including a wire harness and a junction box. The junction box contains a plurality of junction box terminals and it also carries an attachment unit projecting outwardly. The attachment unit has a plurality of openings in its outer surface through which the junction box terminals project. One end of the terminals is in contact with the internal circuit of the junction box and the other is a pair of cutting blades into which the wire is inserted. An intermediate section of the wires is attached in accordance with the foregoing, and the ends are inserted into a plurality of connection boxes. The openings may be in multiple rows, offset transversely from each other. This permits inclusion of a large number of terminals in a relatively small space.

15 Claims, 11 Drawing Sheets

WIRE HARNESS ASSEMBLY

This Application claims the benefit of the priorities of Japanese Applications 10-79989, filed Mar. 26, 1998; 10-79990, filed Mar. 26, 1998; and 10-89103, filed Apr. 1, 1998.

The present Invention is directed to an assembly for connecting wire harnesses with junction boxes and connection boxes. More specifically, it relates to a connector-less connection between wires from a wire harness and the internal circuit of the junction box.

BACKGROUND OF THE INVENTION

In the past, when wires which connect a wire harness with an internal circuit of a junction box are produced, pressure-contact terminals are usually crimped to the exposed core of the wire. These terminals are located in a connector which is fitted within a connector receptacle on the junction box. The terminals form an electrical connection via junction terminals to tabs on a busbar which is part of the internal circuit of the junction box. Customarily, the internal circuit is formed from single-core wires and pressure-contact terminals. In such a case, tabs (or junction terminals connected thereto), for forming electrical connections with external terminals, project into the connector in order to mate with the pressure-contact terminals therein. These terminals are connected to the ends of the wire harness.

Since the junction box and the wire harness are connected through a connector, it is necessary to crimp the pressure-contact terminals onto the ends of wires which are part of the wire harness. Moreover, these pressure-contact terminals must be inserted into a connector. As a result, many steps are necessary and a large number of parts (pressure-contact terminals and connectors) must be used. This increases cost and the likelihood of human error in assembly. Under normal circumstances, the terminals located in the connector are spaced apart from each other in a single row. This is wasteful of space, especially if there are a large number of such terminals.

In an attempt to solve the foregoing problems, the present Applicants proposed, in Japanese OPS 8-227738, a configuration for connecting connector-less electrical junction boxes and wire harnesses, as shown in FIG. 15 hereof. Wire harness W/H is composed of a plurality of wires W. These lead from the external circuit of wire harness W/H and the ends are inserted through wire insertion openings 1a into lower case 1 of junction box 10. A connector-less connection is formed between the cores of wires W and the conductors of the internal circuit by welding or the use of pressure-contact terminals 3. Thereafter, upper case 2 is affixed to lower case 1 to complete the assembly.

This configuration, however, suffers from certain drawbacks. The ends of the wires are inserted into the junction box and connected to the internal circuit. Hence, the junction box can be assembled only after the wires have been completely connected at the wire harness assembly workbench. In other words, if the wire harness is loosely bound (with the wires not completely assembled), it cannot be connected to a completed junction box containing the internal circuit. If it is necessary to first completely bind the wire harness at the wire harness assembly workbench, the entire operation becomes increasingly complex, resulting in a substantial cost increase.

Furthermore, in the foregoing arrangement, only the ends of the wire harness can be connected to the junction box. It is not possible to connect intermediate portions of the wire harness in this fashion. In addition, there is a danger that, since the wires inserted into the box are not fixed, any tension on the wire is liable to impair or destroy the connection with the internal circuit in the box. Hence, the reliability of the assembly is reduced.

SUMMARY OF THE INVENTION

It is, therefore, among the objects of the present Invention to provide a connector-less connection between a junction box, connection box, and an intermediate section of a loosely bound wire harness. It is also among the objects of the present Invention to permit the wires and a large number of terminals in the junction box and connection boxes to be connected. It is further among the objects of the present Invention to minimize the space required for making the foregoing connections. Still further among the objects of the present Invention is the prevention of tension being applied to the connecting section, thereby improving its reliability. It is further among the objects of the present Invention to facilitate the making of the connections and reducing the number of steps required for doing so.

In accordance with the present Invention, there is provided a wire harness assembly which includes a wire harness and a junction box, the latter containing a plurality of junction box terminals. The assembly also includes an attachment unit which projects outwardly from the junction box.

The attachment unit has an outer surface which is remote from the junction box and a plurality of openings is located therein. One of the ends of the junction box terminals is in electrical contact with an internal circuit therein. The other ends of the junction box terminals are provided with blades which extend through the openings and project outwardly therefrom. The wires of the wire harness are pressed against the blades, whereby they contact the junction box terminals to form electrical connections with the internal circuit. A forward end of each of the wires is connected to a connector terminal in a connection box by pressure contact. Usefully, it is an attachment portion of the wires, preferably intermediate their ends, which is connected to the junction box terminals and one or both ends of the wires are connected to connector terminals in connection boxes.

Usually, there is a plurality of connection boxes, each having a terminal insertion chamber and at least one connector terminal therein. Cutting ends are located on the outer ends of the connector terminals and, when the wires are pressed against the cutting ends, are adapted to make electrical contact with the cores thereof.

The blades on the junction terminals are spaced apart in a direction transverse to the axis of the wires by a distance constituting a first pitch. Similarly, the cutting ends of the connection boxes are spaced apart transversely by a second pitch. Thus, if the pitches are alike, a single automated pressing tool can be used to force all of the wires between both the blades on the junction box and the cutting ends on the connection boxes.

However, there are situations wherein the internal circuits in the junction box include busbars, which are relatively thick. Since only the wires go to the connection boxes, it is to be expected that the second pitch can be much smaller than the first pitch. In such a situation, it is advisable, according to the Invention, that the first pitch be an even multiple of the second. For example, if the blades, because they are attached to busbars (or for any other reason), must be separated at a pitch of 5 mm, the cutting ends of the connector terminals advantageously should be at a pitch of 2.5 mm. In this way, the automatic tool which presses all of the wires into the blades can also be used for the same purpose with respect to the cutting ends.

In this situation, every other wire will be pressed into the cutting ends in the first press; a second press, after the tool or the connector terminal is moved 2.5 mm transversely, will complete the insertion. Alternatively, it is possible to have the tool with bearing surfaces at the smaller pitch. In that case, every other surface will be inoperative when pressed against the blades in the junction box, and they will all be operative when used in connection with the cutting ends in the connector box. This form of the Invention has the advantage of requiring only one operation of the automated tool to insert all of the wires in each box. It has been found particularly advantageous to provide a construction wherein the first pitch is twice the second pitch.

It has been found particularly useful in the present Invention if first and second pluralities of blades (and the openings therefor) are provided on the junction box. Each plurality is arranged in a straight line and they are offset transversely from each other. This permits the pitch between blades in one line and the adjacent blades in the other line to be half that between adjacent blades in the same line. In this way, more wires and terminals can be placed in less space, thereby reducing the size of the entire assembly. It is within the contemplation of this Invention that there can be three or more lines of blades, similarly offset from each other. In such a case, the blades in a single line can be even further apart and the pitch between adjacent blades in different lines is even smaller. In these situations, it is also advantageous to provide blades which extend different distances from the junction box in order to facilitate differentiation thereof.

In providing an assembly in accordance with the present Invention, it is desirable to have a plurality of busbars as part of the internal circuit of the junction box. These are advantageously laminated with insulating plates between adjacent busbars. Moreover, the blades can be formed on the ends of at least some of the busbars which are bent so as to project through the openings and receive the wires. This is a very convenient and economical way to produce the junction box terminals as it involves merely stamping and bending.

BRIEF DESCRIPTION OF THE DRAWINGS

In the accompanying drawings, constituting a part hereof, and in which like reference characters indicate like parts.

DETAILED DESCRIPTION OF THE INVENTION

Figure 1:
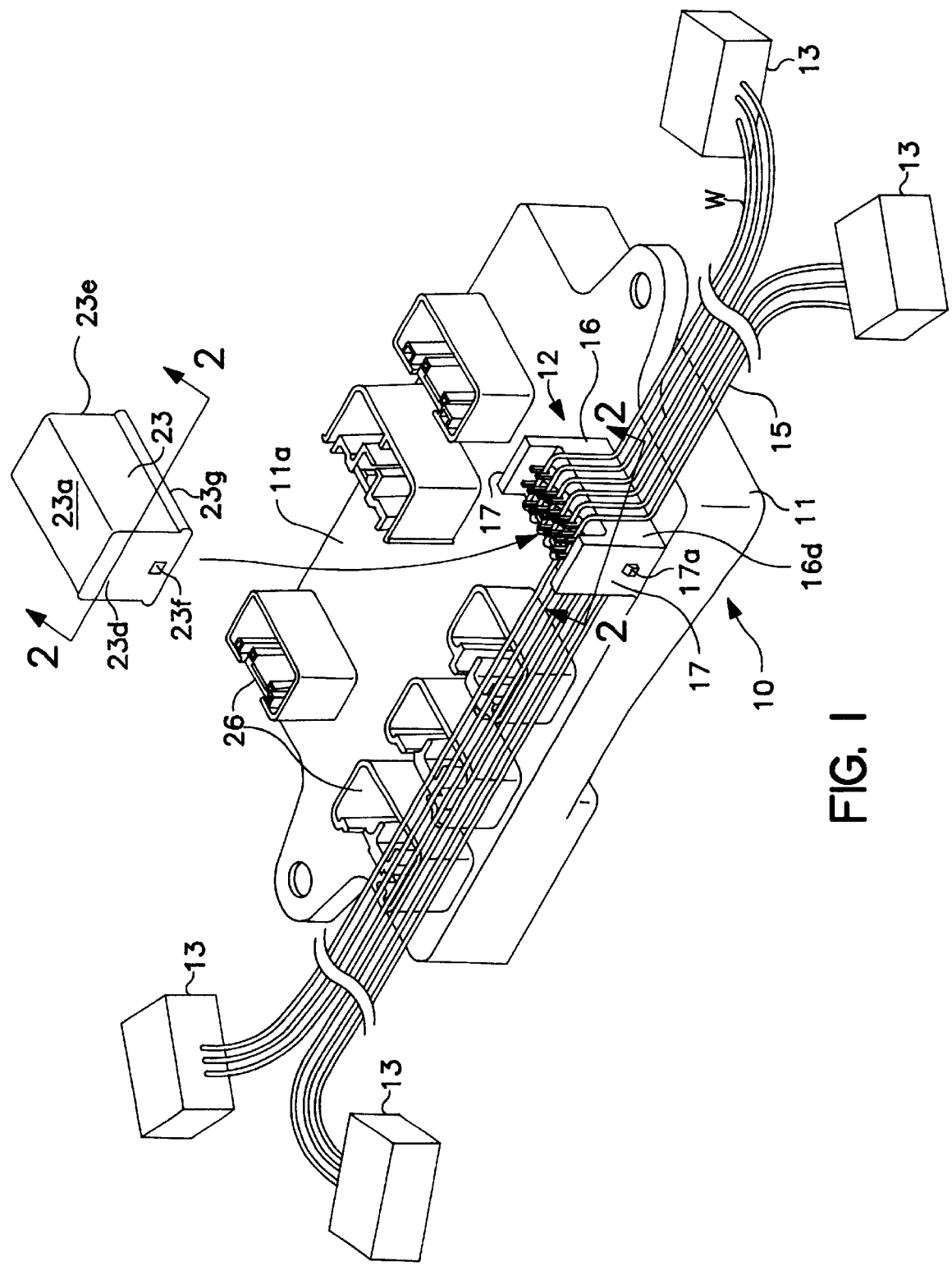
FIG. 1 is a schematic perspective view of a junction box and four connection boxes in accordance with the present Invention.
Figure 2:
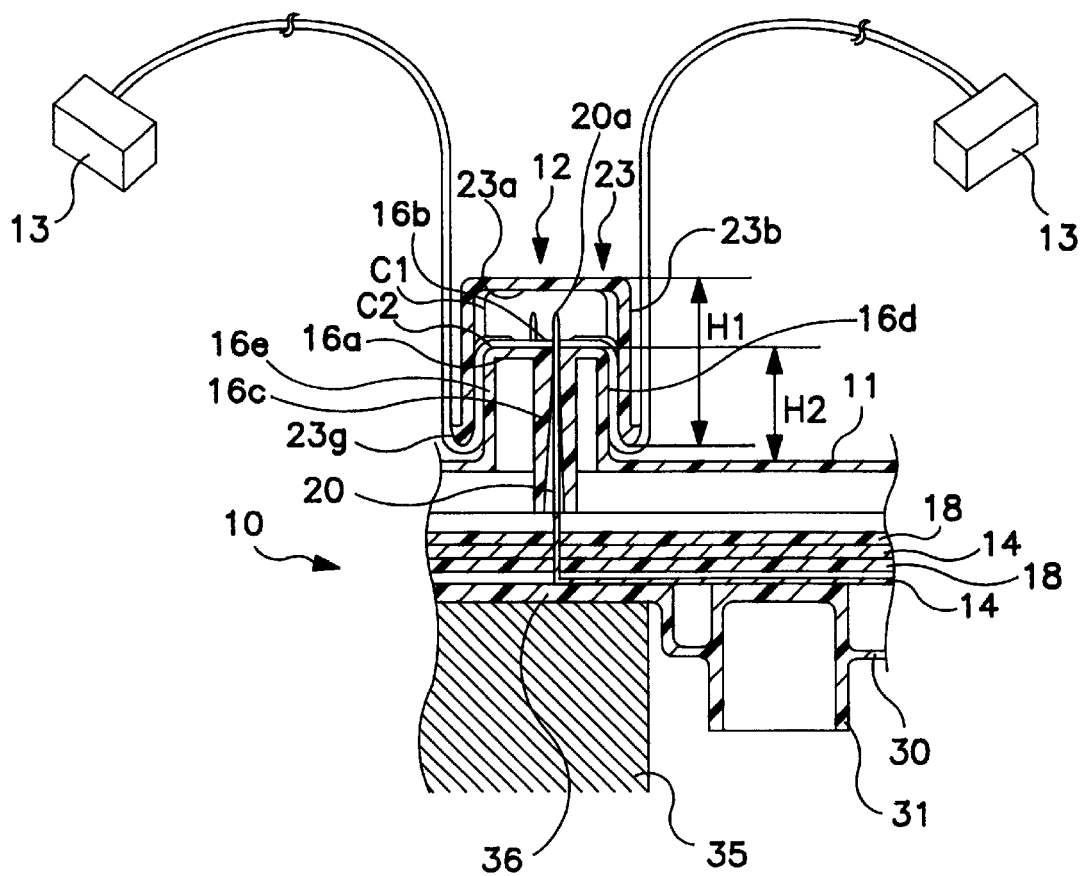
FIG. 2 is a cross section of the attachment unit of FIG. 1; taken along sectional line 2 of FIG. 1
Figure 3A:
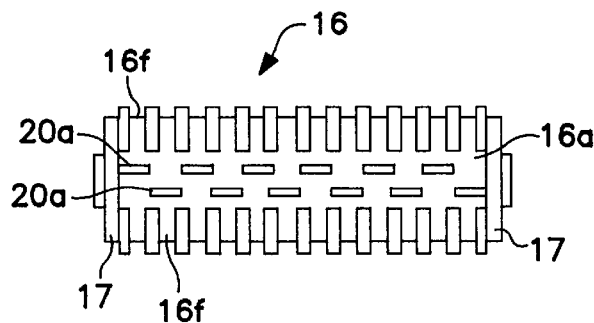
FIG. 3A is a plan view of the attachment unit.
Figure 3B:
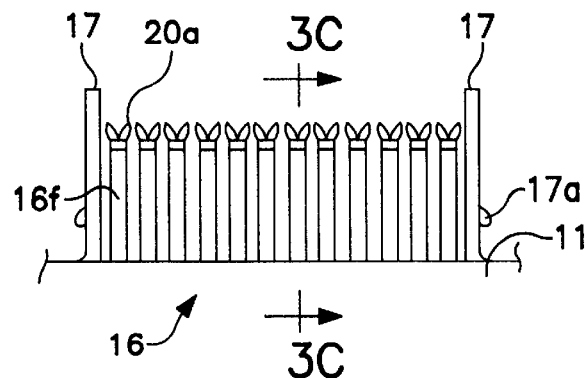
FIG. 3B is an elevation of the attachment unit of FIG. 3A.
Figure 3C:
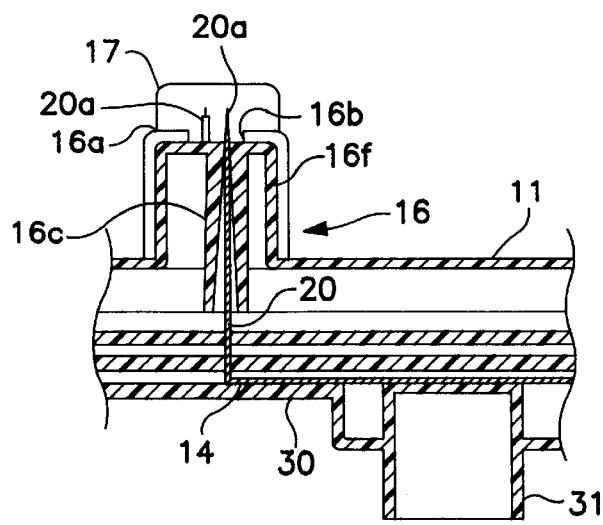
FIG. 3C is a transverse cross section of FIG. 3B also showing a portion of the junction box; taken along sectional line 3C of FIG. 3B
Figure 4:
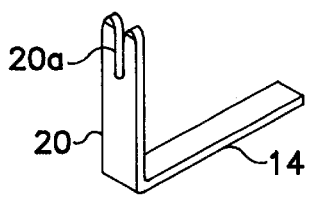
FIG. 4 is a perspective view of the junction box terminal.

As shown in FIGS. 1 and 2, first case 11 and second case 30 of junction box 10 are provided, on surface 11a, with direct connection unit 12 and connector receptacles 26. Wire harness 15 is connected, at its intermediate portion, to attachment unit 16 and, at its ends, to connection boxes 13. Cover 23 has sides 23d and 23e as well as rounded wire guide 23g. Cover 23 fits over attachment unit 16 and locking claw 17a on attachment plate 17 enters lock hole 23f on cover 23, thereby holding it in place.

Figure 7:
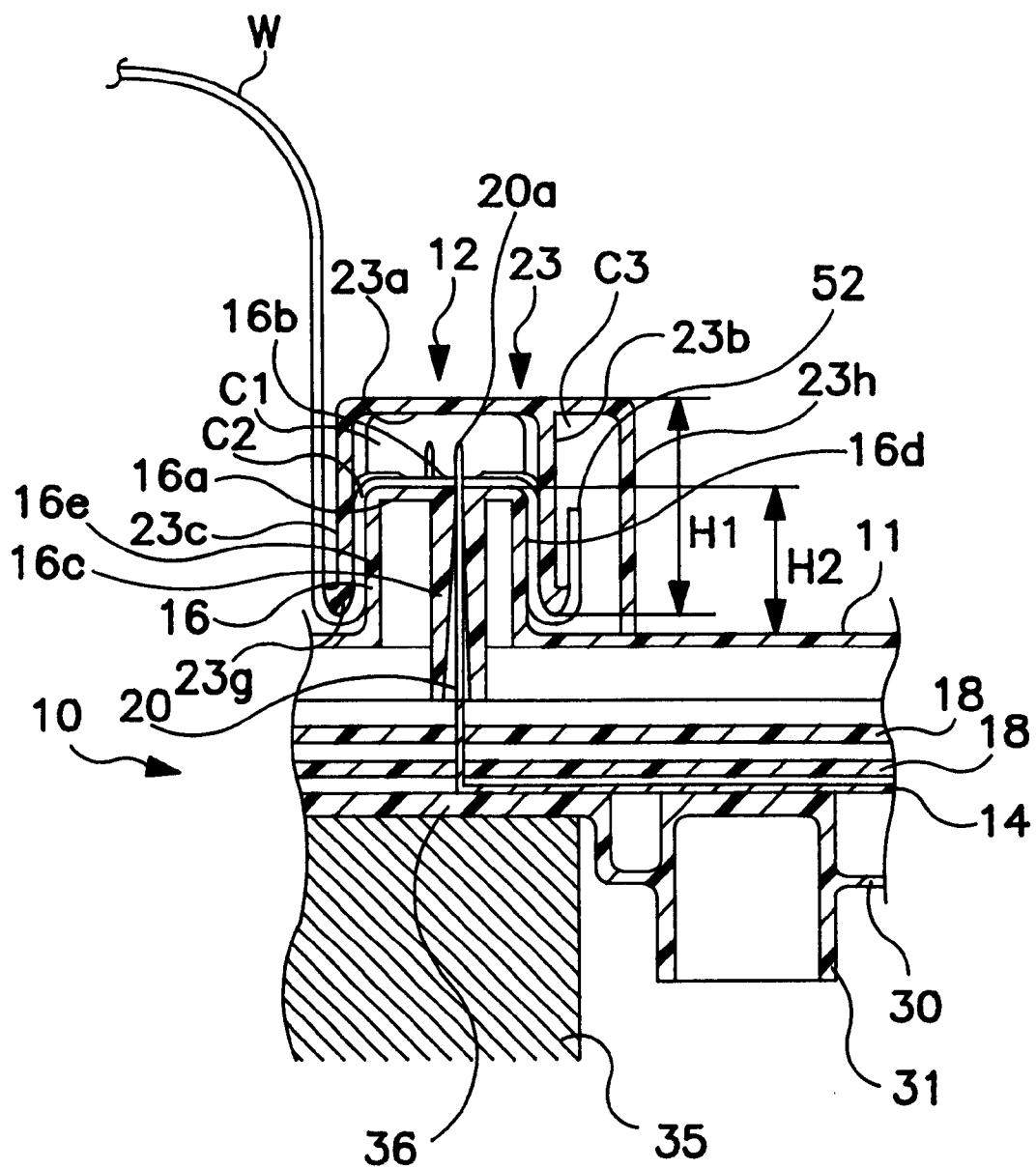
FIG. 7 is a cross section, similar to that of FIG. 2, of the attachment unit of FIG. 6; taken along sectional line 7 in FIG. 6

Referring now to all of the Figures, attachment unit 16 comprises outer surfaces 16d and 16e, bottom surface 16a, and opening 16b in the bottom surface. Guides 16c direct junction box terminal 20 through opening 16b. Junction box terminal 20 terminates in blades 20a which project outwardly of bottom surface 16a. Cover 23 having outer wall 23h consisting of long sides 23b and 23c fits over attachment unit 16. Space C1 between remote surface 23a and bottom surface 16a allows room for projecting blades 20a. The difference between cover height H1 and unit height H2 provides the necessary space. Junction box terminal 20 is formed from busbar 14 bent so that it can project through opening 16b. As can readily be seen in FIGS. 2 and 7, attachment unit 16 has an inverted U-shaped cross section made from bottom surface 16a and outer surfaces 16d and 16e. Also, as shown in FIGS. 2 and 7, cover 23 has an inverted U-shaped cross section made from remote surface 23a (interior surface) and long sides 23b and 23c. Furthermore, as shown in FIGS. 2 and 7, wire W takes on the inverted U-shaped configuration when cover 23 is mated to attachment unit 16.

There is a plurality of busbars 14 in laminated form with insulating plates 18 between adjacent busbars. The busbars are bent to form junction box terminals 20. Second case 30 carries attachment receptacles 31 and is provided with flat section 36 to receive load bearing tool 35. When assembling, load bearing tool 35 is placed against flat section 36 to provide firm support therefor. Wires W, passing between blades 20a extend around rounded wire guides 23g and terminate at connector boxes 13.

Gap C2 is provided between sides 23b and 23c of cover 23 and outer surfaces 16d and 16e of attachment unit 16. Gap C2 is approximately the same width as the diameter of wire W. Therefore, the wire is snugly held thereby. Attachment unit 16 is provided with a plurality of wire guide grooves 16f into which the wires are placed. Each is so located as to permit the wire to be engaged by blades 20a. In the assembly as shown in FIG. 7, terminal end 52 is located in hollow C3. This protects the terminal end against damage.

Connection box 13 contains connector terminals 51 in terminal insertion chamber 50. Connector terminals 51 are provided with cutting ends 38 to receive and make contact with wires W. Lid 37 can be used to force wires W onto cutting ends 38 to make this contact.

Figure 5A:
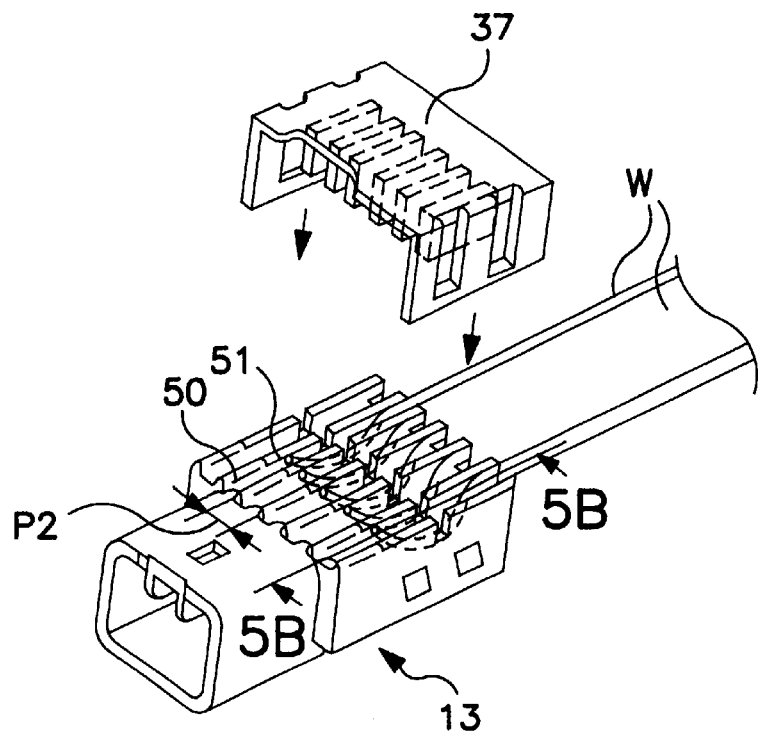
FIG. 5A is a perspective exploded view of a connection box.
Figure 5B:
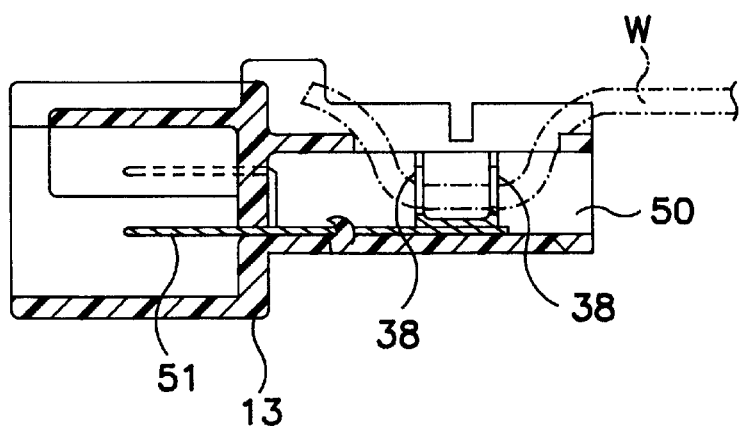
FIG. 5B is a longitudinal cross section of the connection box of FIG. 5A; taken along sectional line 5B in FIG. 5A
Figure 6:
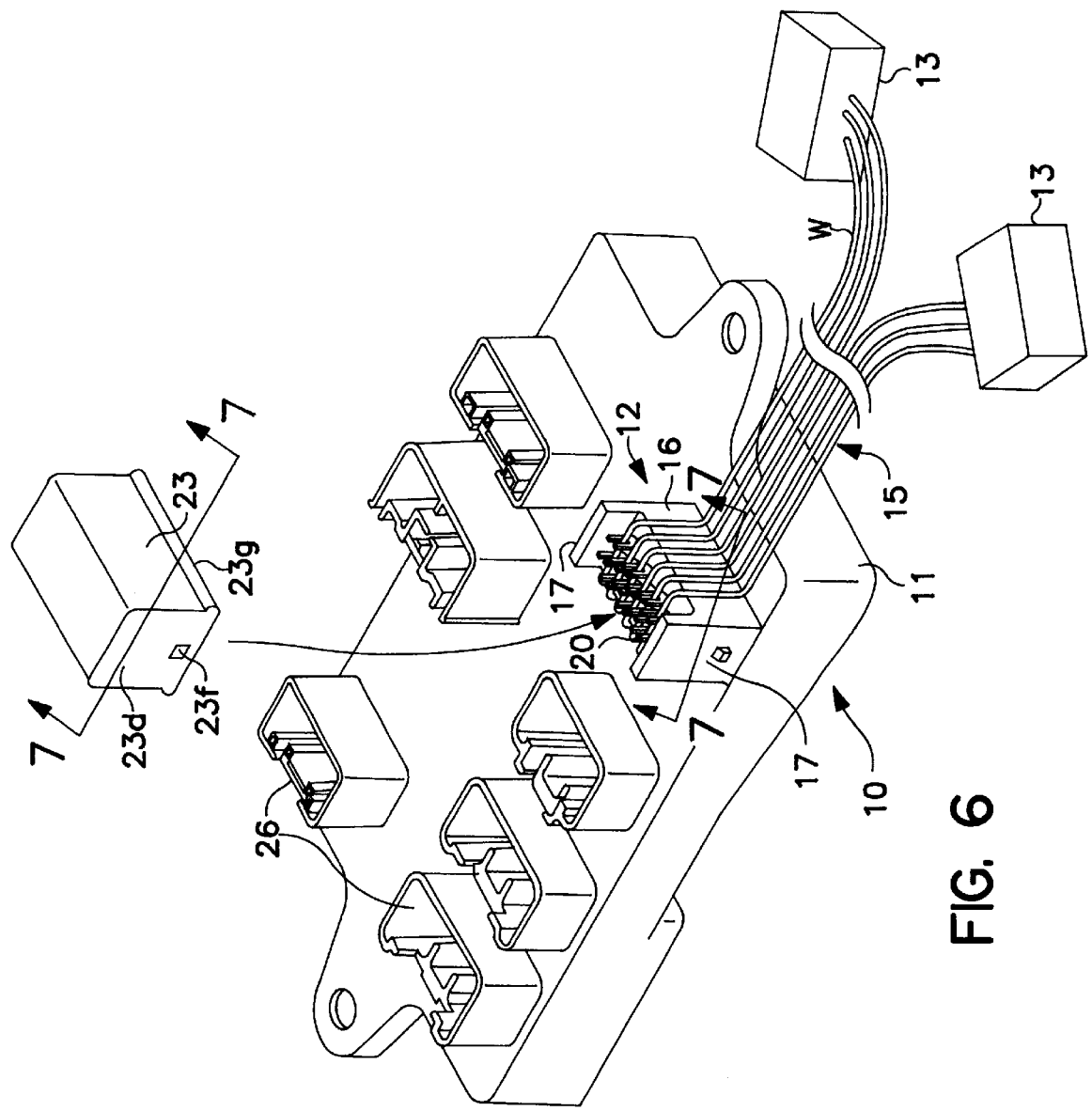
FIG. 6 is similar to FIG. 1 wherein the wire harness is connected to two connection boxes.
Figure 8A:
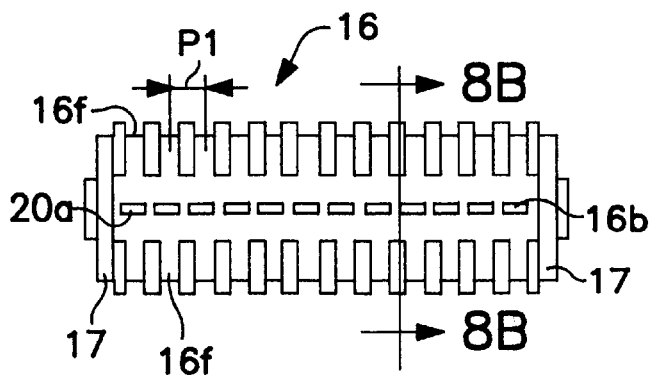
FIG. 8A is a view, similar to that of FIG. 3A, of the attachment unit of FIG. 6.
Figure 8B:
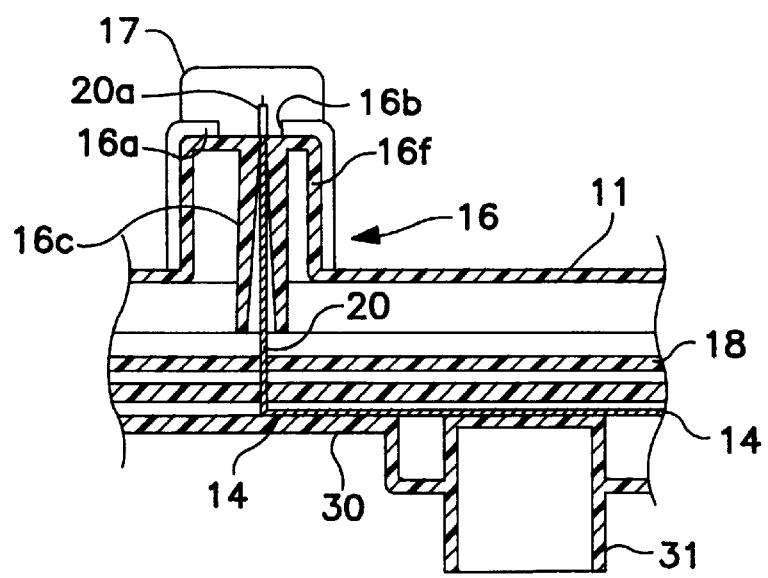
FIG. 8B is a view, similar to that of FIG. 3C, of the device as shown in FIG. 6; taken along sectional line 8B of FIG. 8A
Figure 9:
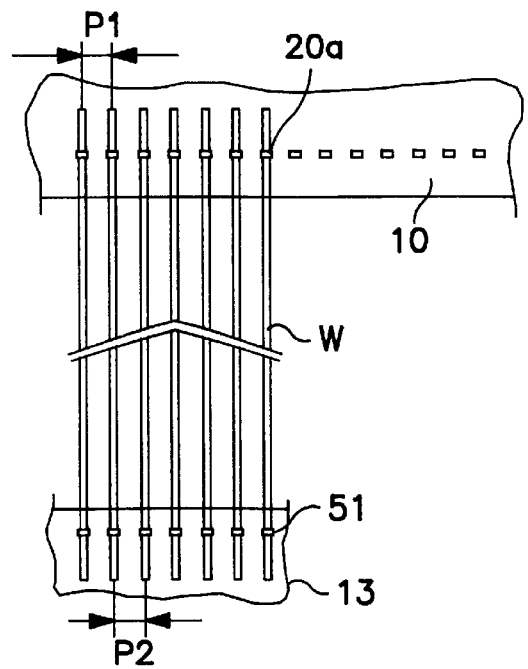
FIG. 9 is a schematic view showing the connection and spacing of wires in the junction box and the connector box wherein the pitches are the same.
Figure 10:
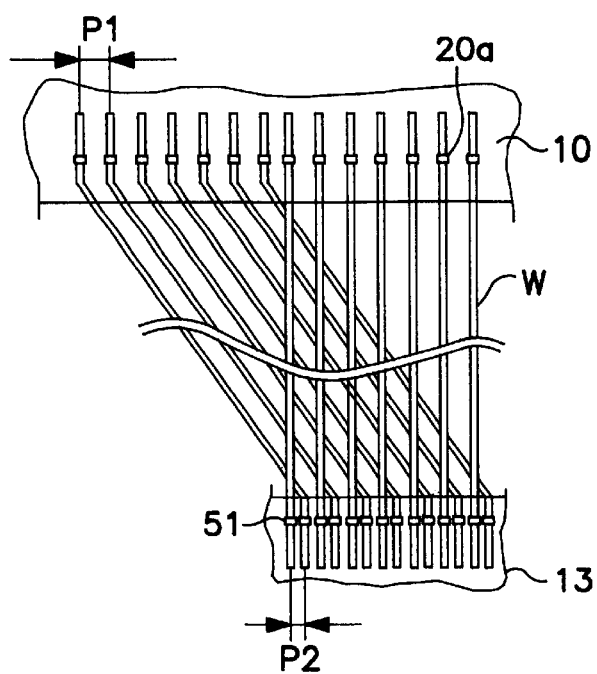
FIG. 10 is a view, similar to that of FIG. 9, of the junction box and connection box wherein the pitches are different.

As shown in FIGS. 5A and 8A, in the construction wherein busbars 14 are sufficiently large, wire guide grooves 16f are spaced apart by a distance equal to pitch P1. At the same time, it is unnecessary to spread connector terminals 51 this far. Therefore, as shown in FIGS. 9 and 10, P1 is (for example) 5 mm and P2 is 2.5 mm. This permits the same pressing tool to insert wires W in both blades 20a and cutting ends 38. If a widely spaced tool is used, it matches pitch P1 and will insert all wires W into blades 20a in one operation. When it comes to connector terminals 51, it is actuated a first time, and thereby inserts every other one of wires W into connector terminals 51 and then, after either connector box 13 or the pressing tool are shifted transversely a distance equal to P2, it is actuated a second time, thereby inserting the remainder of wires W into connector terminals 51.

Figure 11:
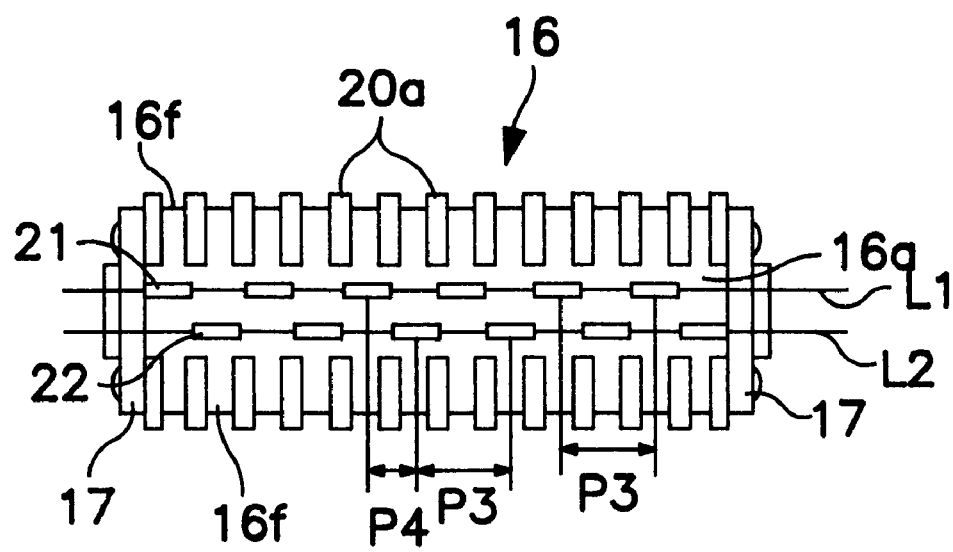
FIG. 11 is a view, similar to that of FIG. 8A, of the attachment unit having staggered openings.
Figure 12:
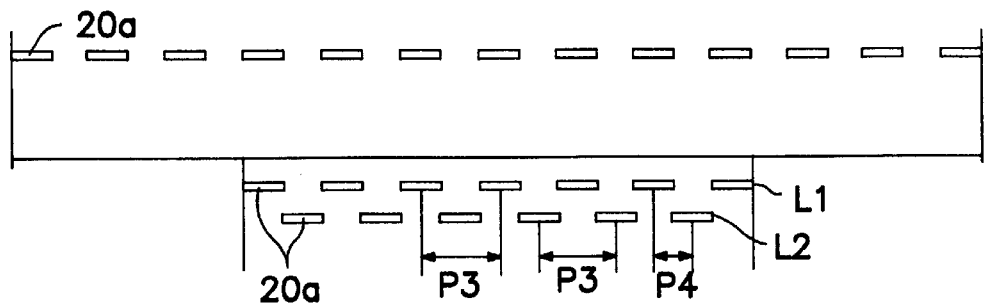
FIG. 12 is a schematic representation of the openings in the junction box showing both the single line and the double line of offset openings.
Figure 13:
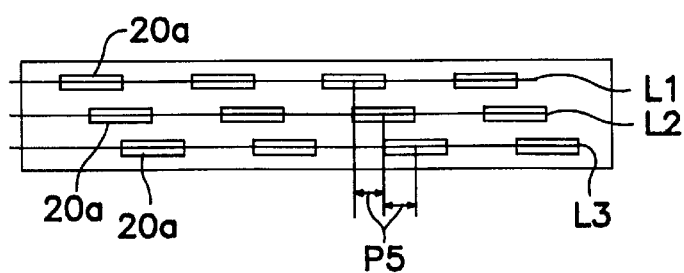
FIG. 13 is a view showing three lines of offset openings in the junction box.
Figure 14:
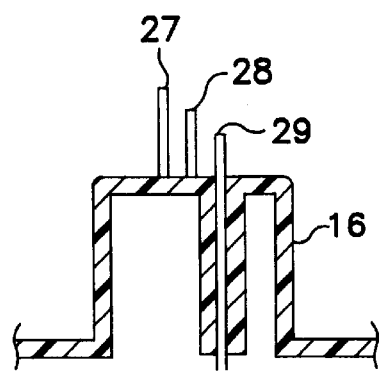
FIG. 14 is a cross sectional view of the attachment unit of FIG. 13.
Figure 15:
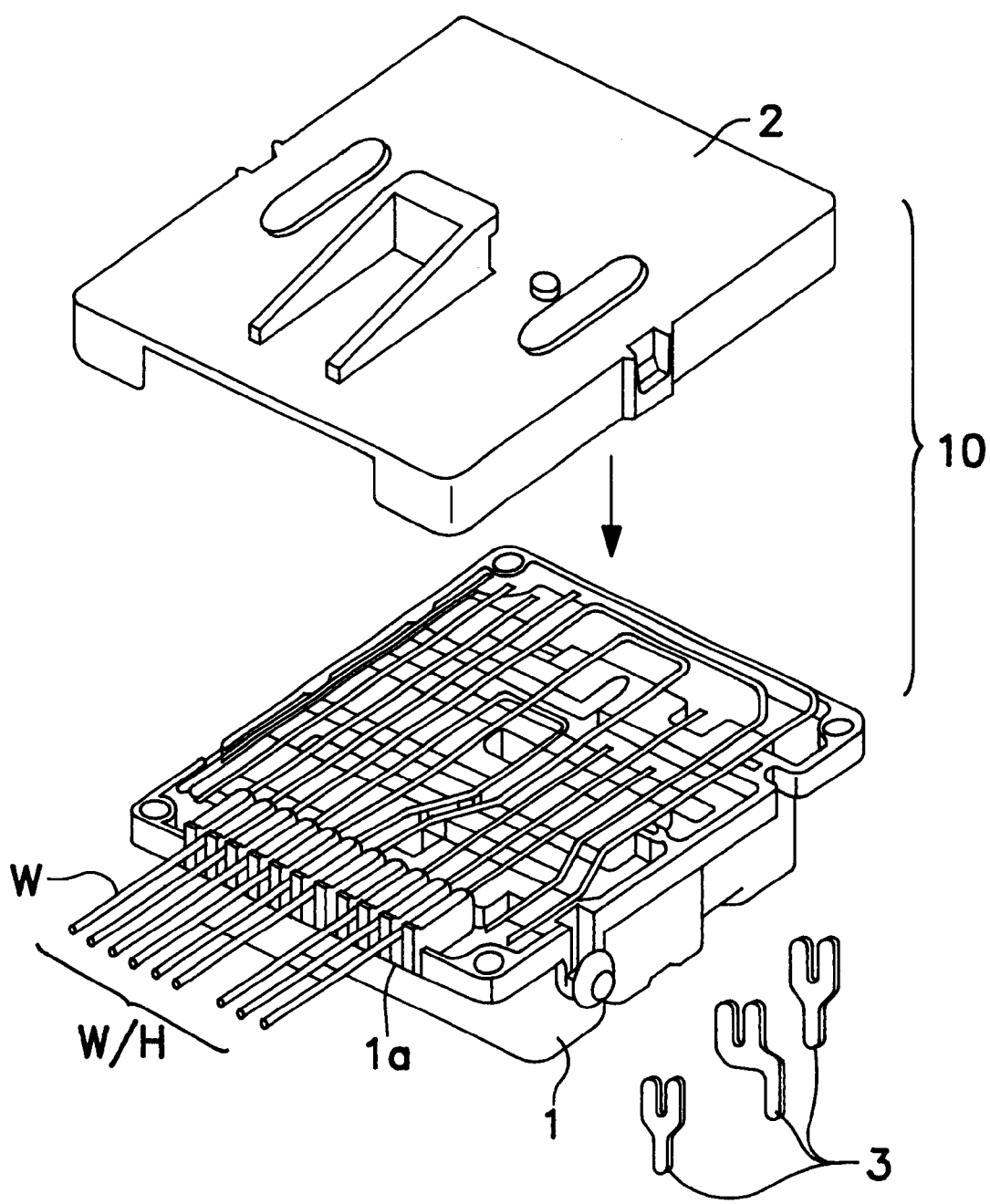
FIG. 15 is an exploded perspective view in accordance with the prior art.

In order to make the device more compact, there is provided first line L1, consisting of a row of blades 21, and second line L2, consisting of a row of blades 22 (see FIGS. 11 and 12). These are spaced apart longitudinally of wires W and offset transversely thereto. Pitch P3 is the distance between adjacent blades 20a in either first line L1 or second line L2. Pitch P4 is the distance between blades 20a in one line and the nearest adjacent blades 20a in the other line. P4 is much less than P3 thereby enabling attachment unit 16 (as well as junction box 10) to be made much smaller. When there are three lines L1, L2, and L3, as shown in FIGS. 13 and 14, the difference is even greater. Pitch P5 is even smaller than pitch P4, even though adjacent blades 20a are spaced farther apart in a given line than pitch P3. In this configuration, blades 27 extend further from attachment unit 16 than blades 28 which, in turn, extend further from attachment unit 16 than blades 29. This feature assists in insertion of wires W into the blades while, at the same time, facilitating the reduction in size.

Thus, the present Invention permits a loosely bound wire harness to be directly connected without connectors to an assembled junction box having an internal circuit. This enables the elimination of terminals crimped onto the ends of the wires, insertion of the crimped terminals into a connector, and fitting the connector into a receptacle of a junction box in order to complete the circuit. This constitutes a significant cost-saving reduction in both parts and difficulty of operation.

Although only a few aspects of the present Invention have been expressly disclosed, it is, nonetheless, to be broadly construed and not to be limited except by the character of the claims appended hereto.

What we claim is:

1. A wire harness assembly comprising:

a wire harness, and a junction box containing a plurality of junction box terminals, positioned in said junction box an attachment unit projecting outwardly from said junction box, said attachment unit having an inverted U-shaped cross section, said attachment unit having an outer surface remote from said junction box, said outer surface corresponding to the closed end portion of said inverted U-shape a plurality of openings in said outer surface, said junction box terminals having blades extending through said openings and projecting outwardly thereof, wires of said wire harness are pressed against said blades at an attachment portion of said wires which is spaced apart axially from a forward end of each of said wires thereby to contact said junction box terminals to said wires of said wire harness said forward end of each of said wires in said wire harness pressure contact connected to a connector terminal in a connection box, a cover having an inverted U-shaped cross section so as to fit over said attachment unit and hold said wires onto said attachment unit, said cover, causing said wires to have an inverted U-shaped configuration to conform to said attachment unit and said cover, said cover having an interior surface parallel to and spaced apart from said outer surface, thereby defining a space between said outer surface and said interior surface, at least a portion of said wires being in said space as said wires pass over said attachment unit.

2. The assembly of claim 1 comprising a plurality of connection boxes, each of said connection boxes having a terminal insertion chamber, at least one connector terminal in said chamber, cutting ends on said connector terminal and in electrical contact therewith, said cutting ends, when said wires are pressed thereagainst, adapted to make electrical contact with said wires, said blades being spaced apart in a transverse direction to axes of said wires by a first pitch, said cutting ends being spaced apart in said transverse direction by a second pitch, said first and said second pitch being either the same or one of said first pitch and said second pitch being an even multiple of the other.

3. The assembly of claim 2 wherein said first pitch is a multiple of said second pitch.

4. The assembly of claim 3 wherein said first pitch is twice said second pitch.

5. The assembly of claim 1 comprising a plurality of connection boxes, each of said connection boxes having a terminal insertion chamber, at least one connector terminal in said chamber, cutting ends on said connector terminal and in electrical contact therewith, said cutting ends, when said wires are pressed thereagainst, adapted to make electrical contact with said wires, said attachment portion being intermediate both ends of said wires, a first plurality of said blades being spaced apart from each other in a transverse direction to axes of said wires by a first pitch, a second plurality of said blades being spaced apart from each other in said transverse direction, said first plurality and said second plurality being offset from each other in said transverse direction.

6. The assembly of claim 5 comprising at least a third plurality of said blades spaced apart from each other in said transverse direction, said first plurality, said second plurality, and at least said third plurality being offset from each other in said transverse direction.

7. The assembly of claim 6 wherein said first plurality, said second plurality, and said third plurality project from said openings different distances from each other.

8. The assembly of claim 1 wherein said blades includes at least one busbar.

9. The assembly of claim 8 wherein there is a plurality of said busbars which are laminated with an insulating plate between adjacent busbars.

10. The assembly of claim 8 wherein said busbar is bent so that a bus bar end thereof forms said junction box terminal.

11. The assembly of claim 1 wherein said cover further comprising a first side and a second side which are parallel to and spaced apart from each other, said first side and said second side extending from said interior surface toward said junction box and terminating in a first edge and a second edge, respectively, an outer wall on said cover parallel to said first side and spaced apart therefrom in a direction away from said second side, thereby defining a hollow between said outer wall and said first side, a terminal end of at least one of said wires being in said hollow.

12. The assembly of claim 1 wherein, said cover further comprising a first side and a second side which are parallel to and spaced apart from each other, said first side and said second side extending from said interior surface toward said junction box and terminating in a first edge and a second edge, respectively, said attachment unit having a first side wall and a second side wall which are parallel to and spaced apart from each other, said first side wall and said second side wall extending from said junction box to said outer surface, there being a first gap between said first side wall and said first side, said first gap being equal to a diameter of at least one of said wires, some of said attachment portion of said wires being in said first gap.

13. The assembly of claim 12 wherein there is a second gap between said second side and said second side wall, said second gap being equal to said diameter, some of said attachment portion of said wires being in said second gap.

14. The assembly of claim 1 wherein said cover further comprising a first side and a second side which are parallel to and spaced apart from each other, said first side and said second side extending from said interior surface toward said junction box and terminating in a first edge and a second edge, respectively, there being rounded wire guides on at least one of said first edge and said second edge.

15. The assembly of claim 1 wherein there is a flat section of said junction box, a load bearing tool in contact with said flat section whereby, when pressure is exerted on said attachment portion, said tool permits insertion of said wires into said blades without distortion of said junction box.

* * * * *